(12) United States Patent
Shirakawa

(10) Patent No.: US 10,530,116 B2
(45) Date of Patent: Jan. 7, 2020

(54) LASER DEVICE AND LASER STABILIZING METHOD

(71) Applicant: MITUTOYO CORPORATION, Kanagawa (JP)

(72) Inventor: Yusuke Shirakawa, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/173,350

(22) Filed: Oct. 29, 2018

(65) Prior Publication Data

US 2019/0131759 A1 May 2, 2019

(30) Foreign Application Priority Data

Nov. 1, 2017 (JP) .................................. 2017-212034

(51) Int. Cl.
*H01S 3/13* (2006.01)
*H01S 3/086* (2006.01)
*H01S 3/10* (2006.01)

(52) U.S. Cl.
CPC ............ *H01S 3/1303* (2013.01); *H01S 3/086* (2013.01); *H01S 3/1305* (2013.01); *H01S 3/10069* (2013.01)

(58) Field of Classification Search
CPC ........ H01S 3/13; H01S 3/1303; H01S 3/1392; H01S 3/1305; H01S 3/086; H01S 3/10069; H01S 3/09415
See application file for complete search history.

(56) References Cited

U.S. PATENT DOCUMENTS

| 7,613,216 B2 | 11/2009 | Nakagawa |
| 8,958,446 B2 | 2/2015 | Hirose |
| 9,825,423 B2 | 11/2017 | Yano et al. |
| 2008/0130694 A1* | 6/2008 | Nakagawa ............ H01S 3/1392 372/32 |
| 2013/0195132 A1 | 8/2013 | Yano et al. |

FOREIGN PATENT DOCUMENTS

JP 2008-141054 A 6/2008

\* cited by examiner

*Primary Examiner* — Armando Rodriguez
(74) *Attorney, Agent, or Firm* — Greenblum & Bernstein, P.L.C.

(57) ABSTRACT

A laser device includes an excitation light source, a resonator which receives excitation light from the excitation light source and generates laser light, an absorption cell to which the laser light is emitted, a light converter which converts the laser light passing through the absorption cell to a light output signal, a third order differential lock-in amplifier which generates a third order differential signal of the light output signal, and a controller. When a predetermined waveform of the third order differential signal is detected, the controller includes a return controller that determines a return direction of a resonator length based on the predetermined waveform and a resonator length controller that changes the resonator length to the return direction.

3 Claims, 12 Drawing Sheets

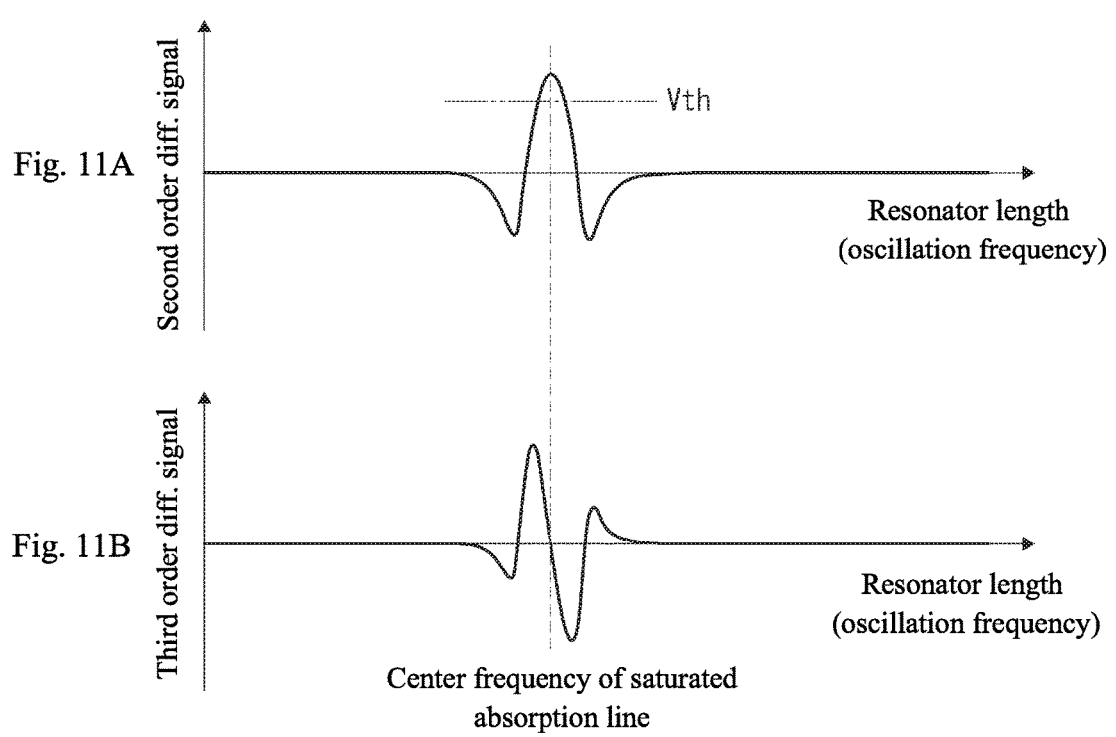

LASER DEVICE AND LASER STABILIZING METHOD

CROSS-REFERENCE TO RELATED APPLICATIONS

The present application claims priority under 35 U.S.C. § 119 of Japanese Application No. 2017-212034, filed on Nov. 1, 2017, the disclosure of which is expressly incorporated by reference herein in its entirety.

BACKGROUND OF THE INVENTION

1. Field of the Invention

The present invention relates to a laser device and a laser stabilizing method.

2. Description of Related Art

Conventionally, a laser device is known in which an oscillation frequency of a resonator is stabilized to a specific saturated absorption line of an absorption cell (see, e.g., Japanese Patent Laid-open Publication No. 2008-141054). Such a laser device, in order to stabilize an oscillation frequency, includes a drive controller controlling a resonator length based on a light output signal by laser light emitted from a resonator.

Specifically, the drive controller first changes the resonator length within a predetermined range and searches for the saturated absorption line based on a second order differential signal and a third order differential signal of the light output signal (saturated absorption line search process). In the process of the saturated absorption line search, the second order differential signal and the third order differential signal show waveforms as shown in FIG. 10. The drive controller determines that the saturated absorption line has been observed when an output value of the second order differential signal is equal to or higher than a predetermined voltage value Vth and the output value of the third order differential signal is in the vicinity of 0 V (see FIG. 11).

Next, by achieving the resonator length where the specific saturated absorption line has been observed, the drive controller locks the oscillation frequency to a frequency corresponding to the specific saturated absorption line (frequency locking process). Then, the drive controller uses the output value of the third order differential signal as an index and controls the resonator length such that the output value of the third order differential signal to be in the vicinity of 0 V. Accordingly, the oscillation frequency is stabilized in the vicinity of a center frequency of the specific saturated absorption line (frequency stabilizing control).

In the frequency stabilizing control by the conventional laser device, as described above, the resonator length is kept at a target value Lo by controlling the resonator length such that the output value of the third order differential signal to be in the vicinity of 0 V (see FIG. 12).

However, when an external disturbance or the like such as vibration occurs to a resonator casing, the output value may exceed a control range Rc due to a sudden change of the resonator length. For example, as shown in FIG. 12, when the resonator length has a value L1 or L2 outside of the control range Rc, the output value of the third order differential signal is near 0 V even though the resonator length is changed significantly from the target value Lo. In this case, the resonator length cannot be controlled based on the output value of the third order differential signal and the frequency stabilizing control cannot be continued. Therefore, it takes up time and effort to restart the laser device, and the like.

SUMMARY OF THE INVENTION

The present invention provides a laser device and a laser stabilizing method which allow a stable frequency stabilizing control to be continued.

The laser device according to the present invention includes an excitation light source, a resonator which receives excitation light from the excitation light source and generates laser light, an absorption cell to which the laser light is emitted, a light converter which converts the laser light passing through the absorption cell to a light output signal, a differential signal generator which generates a third order differential signal of the light output signal, a return controller determines, when a predetermined waveform of the third order differential signal is detected, a return direction of a resonator length based on the predetermined waveform, and a resonator length controller which changes the resonator length to the return direction.

In the present invention, similar to a conventional technique, within a range of the resonator length (control range) where a specific saturated absorption line appears, the resonator length is controlled to a target value based on the third order differential signal (frequency stabilizing control). Accordingly, an oscillation frequency of the laser light is stabilized to the specific saturated absorption line. In this example, the third order differential signal shows a predetermined waveform at the moment when the resonator length deviates from the control range due to a sudden change by an external disturbance or the like. The predetermined waveform of the third order differential signal includes a peak waveform with equal to or greater than the predetermined range, for example, and a shape of the waveform differs depending on whether the change of the resonator length due to the external disturbance or the like being in an increasing direction or a decreasing direction. In view of the above, in the present invention, the return controller determines the return direction for returning the resonator length to an original state based on the detected waveform of the third order differential signal. The resonator length controller changes the resonator length to the returning direction, and thereby the resonator length can be returned to the original control range where the specific saturated absorption line appears. Therefore, according to the laser device of the present invention, the frequency stabilizing control can be continued stably even when the external disturbance or the like occurs.

In the laser device of the present invention, preferably, the return controller determines the return direction of the resonator length based on an initial peak value being positive or negative when the third order differential signal indicates the predetermined waveform. In the present invention, the return direction of the resonator length can be readily determined.

A laser stabilization method according to the present invention uses the laser device that includes an excitation light source, a resonator which receives excitation light from the excitation light source and generates laser light, an absorption cell to which the laser light is emitted, a light converter which converts the laser light passing through the absorption cell to a light output signal, and a differential signal generator which generates a third order differential signal of the light output signal. When the predetermined waveform of the third order differential signal is detected, the method determines a return direction of the resonator length based on the waveform and changes the resonator length to the return direction. In the present invention, similar to the laser device of the present invention as described above, the frequency stabilizing control can be continued stably even when the external disturbance or the like occurs.

The laser device and the laser stabilizing method of the present invention can continue the frequency stabilizing control stably.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 10A illustrates a change of a second order differential signal with respect to the resonator length and FIG. 10B illustrates a change of a third order differential signal with respect to the resonator length;

FIGS. 11A and 11B are explanatory diagrams of the conventional technique, where FIG. 11A illustrates the change of the second order differential signal with respect to the resonator length and FIG. 11B illustrates the change of the third order differential signal with respect to the resonator length.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
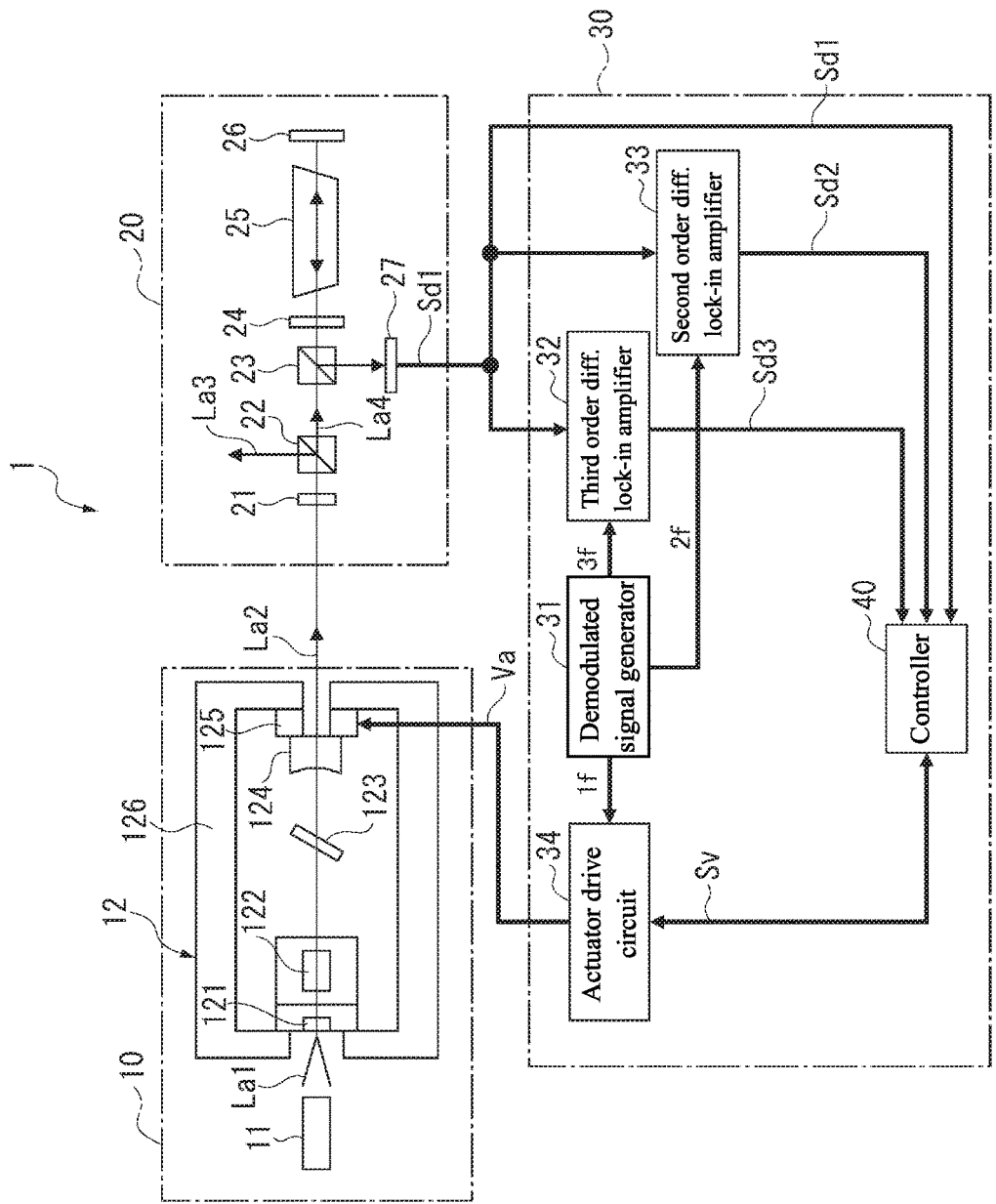
FIG. 1 is a schematic view of a laser device according to an embodiment of the present invention.

Hereafter, an embodiment of the present invention is described with reference to the drawings.
Configuration of Laser Device As shown in FIG. 1, a laser device 1 includes a laser generator 10, a laser light detector 20, and a drive controller 30.

The laser generator 10 includes an excitation light source 11 and a resonator 12. The excitation light source 11 emits an excitation light La1 in the vicinity of 808 nm, for example, by flowing a drive current.

The resonator 12 includes a solid-state laser medium 121, a nonlinear optical crystal 122, an etalon 123, a resonator mirror 124, an actuator 125, and a casing 126 housing these internally. The solid-state laser medium 121 is a Nd:YVO$_4$ crystal and the like, for example, and emits light having a wavelength in the vicinity of 1064 nm (fundamental wave light) which is excited by the excitation light La1. Further, to a surface of the solid-state laser medium 121 on a side to which the excitation light La1 is incident, a coating is applied which passes the excitation light La1 and reflects the fundamental wave light. The nonlinear optical crystal 122 is a KTP crystal and the like, for example, and converts the fundamental wave light emitted from the solid-state laser medium 121 to light having a wavelength in the vicinity of 532 nm (second harmonic wave light). The etalon 123 sets the fundamental wave light and the second harmonic wave light into a single mode by passing through light having a predetermined wavelength.

The resonator mirror 124 is attached to the casing 126 via the actuator 125 such as a piezo element. To a surface of the etalon 123 side of the resonator mirror 124, a coating is applied which reflects the fundamental wave light and passes through the second harmonic wave light. The resonator mirror 124 moves along an optical axis direction of the resonator 12 in accordance with a voltage Va applied to the actuator 125. In other words, the actuator 125 is configured so as to change a resonator length L of the resonator 12.

In the resonator 12, the fundamental wave light emitted from the solid-state laser medium 121 reciprocates between the solid-state laser medium 121 and the resonator mirror 124 and is converted to the second harmonic wave light by the nonlinear optical crystal 122. The second harmonic wave light that is converted by the nonlinear optical crystal 122 passes through the resonator mirror 124 and is emitted as laser light La2 from the resonator 12.

The laser light detector 20 includes a ½ wave plate 21, a first polarized beam splitter 22, a second polarized beam splitter 23, a ¼ wave plate 24, an absorption cell 25 such as an iodine cell, a reflecting mirror 26, and an optical converter 27.

In the laser light detector 20, the laser light La2 emitted from the resonator 12 strikes the first polarized beam splitter 22 by having a polarization direction adjusted by the ½ wave plate 21. The incident light from the first polarized beam splitter 22 is divided into transmitted light of P polarized light and reflected light of S polarized light. Of these, the reflected light of S polarized light (laser light La3) is emitted to an exterior of the laser device 1 and is used in length measurement and the like.

On the other hand, the transmitted light of P polarized light (laser light La4) divided by the first polarized beam splitter 22 passes through the second polarized beam splitter 23 and is fired at the absorption cell 25 via the ¼ wave plate 24. The light passing through the absorption cell 25 is reflected by the reflecting mirror 26 and passes through the absorption cell 25 and ¼ wave plate 24 and strikes again the second polarized beam splitter 23. At this point, the incident light striking again the second polarized beam splitter 23 is the light of S polarized light by passing through the ¼ wave plate 24 twice, and therefore, is reflected by the second polarized beam splitter 23 and strikes the optical converter 27. The optical converter 27 outputs to the drive controller 30 a light output signal Sd1 corresponding to the intensity of the incident light.

The drive controller 30 includes a demodulated signal generator 31, a second order differential lock-in amplifier 33, a third order differential lock-in amplifier 32, an actuator drive circuit 34, and a controller 40. The demodulated signal generator 31 outputs modulated signals 1f, 2f, and 3f of frequencies 1 fHz, 2 fHz, and 3 fHz. The second order differential lock-in amplifier 33 demodulates the light output signal Sd1 with the modulated signal 2f and generates a second order differential signal Sd2. The third order differential lock-in amplifier 32 is a differential signal generator of the present invention and demodulates the light output signal Sd1 with the modulated signal 3f and generates a third order differential signal Sd3. The actuator drive circuit 34 outputs to the actuator 125 the voltage Va demodulated with the modulated signal 1f based on a control signal Sv input from the controller 40.

Figure 2:
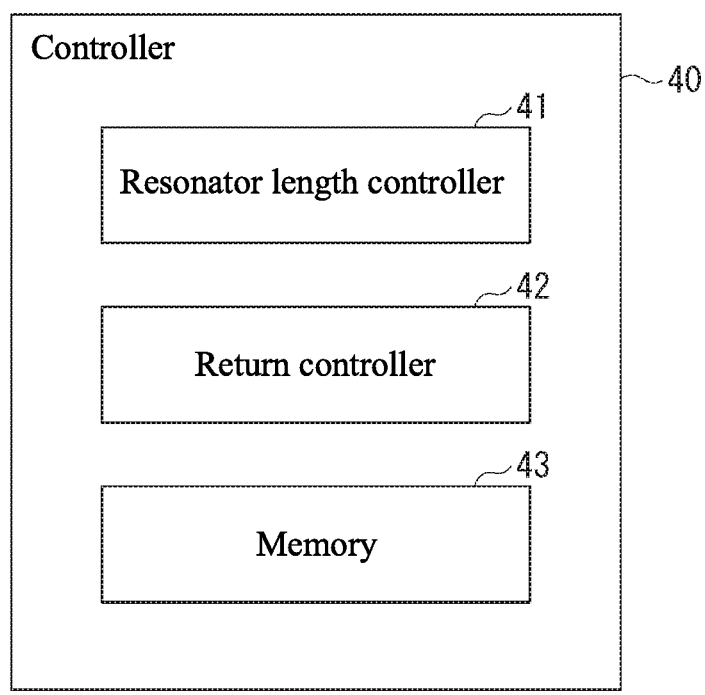
FIG. 2 is a block diagram illustrating a controller of the laser device in the embodiment.

As shown in FIG. 2, the controller 40 is configured by combining a memory, a CPU (Central Processing Unit, or processor), and the like, and serves as a resonator length controller 41 and a return controller 42 by reading and executing a program stored in the memory. The resonator length controller 41 outputs the control signal Sv to the actuator drive circuit 34, and thereby controls the voltage Va applied to the actuator 125. Accordingly, the resonator length L of the resonator 12 is controlled. In the following description, when the resonator length controller 41 controls the voltage Va with the control signal Sv, it simply may be described as controlling the resonator length L. The return controller 42 determines a return direction of the resonator length L when the resonator length L deviates from a control range Rc. In addition, the controller 40 includes a memory 43 that chronologically stores the third order differential signal Sd3 output from the third order differential lock-in amplifier 32.

Operation of Controller 40

In the controller 40, the resonator length controller 41 and the return controller 42 perform the following operations in order to stabilize the oscillation frequency of the resonator 12 to the specific saturated absorption line of the absorption cell 25. First, the resonator length controller 41 searches for, by changing the resonator length L, the saturated absorption line of the absorption cell 25 based on the second order differential signal Sd2 and third order differential signal Sd3 (saturated absorption line search process).

The saturated absorption line of the absorption cell 25 appears as a peak of the light output signal Sd1. Therefore, the resonator length controller 41 records the resonator length L as the value at which the saturated absorption line is detected, the resonator length L being formed where the output value of the second order differential signal Sd2 is equal to or greater than the predetermined voltage value and the output value of the third order differential signal Sd3 is in the vicinity of 0 V.

Figure 4:
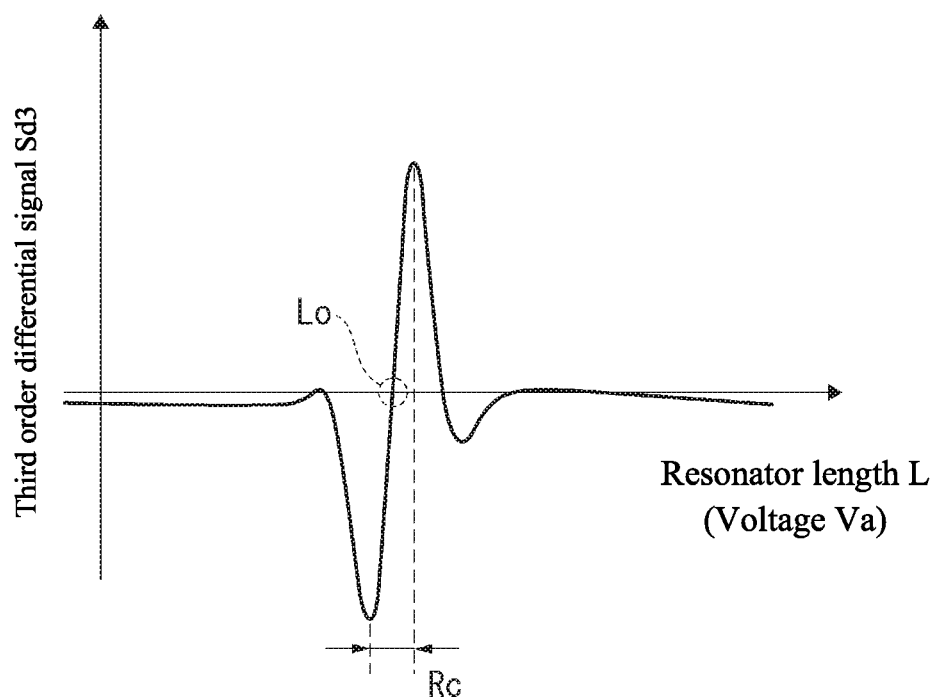
FIG. 4 is a graph illustrating a change of a third order differential signal with respect to a resonator length.

Next, the resonator length controller 41 adjusts the resonator length L to a value corresponding to the center wavelength of the specific saturated absorption line (target value Lo) (see FIG. 4). Accordingly, the oscillation frequency of the resonator 12 is locked in the vicinity of a center frequency of the specific saturated absorption line (frequency locking process).

Then, the resonator length controller 41 controls the resonator length L so as to keep the output value of the third order differential signal Sd3 in the vicinity of 0 V, in the range of resonator length L (control range Rc) in which the specific saturated absorption line appears, using the output value of the third order differential signal Sd3 as an indicator (frequency stabilizing control, see FIG. 4). In the control range Rc of the present embodiment, as the resonator length L increases, the third order differential signal Sd3 increases. Therefore, in the frequency stabilizing control, when the output value of the third order differential signal Sd3 is in the positive side from the 0 V vicinity, the resonator length L is decreased; and when the output value of the third order differential signal Sd3 is in the negative side from the 0 V vicinity, the resonator length L is increased. Accordingly, the resonator length L is stabilized at the target value Lo, so the oscillation frequency of the resonator 12 is stabilized in the vicinity of the center frequency of the specific saturated absorption line.

Figure 3:
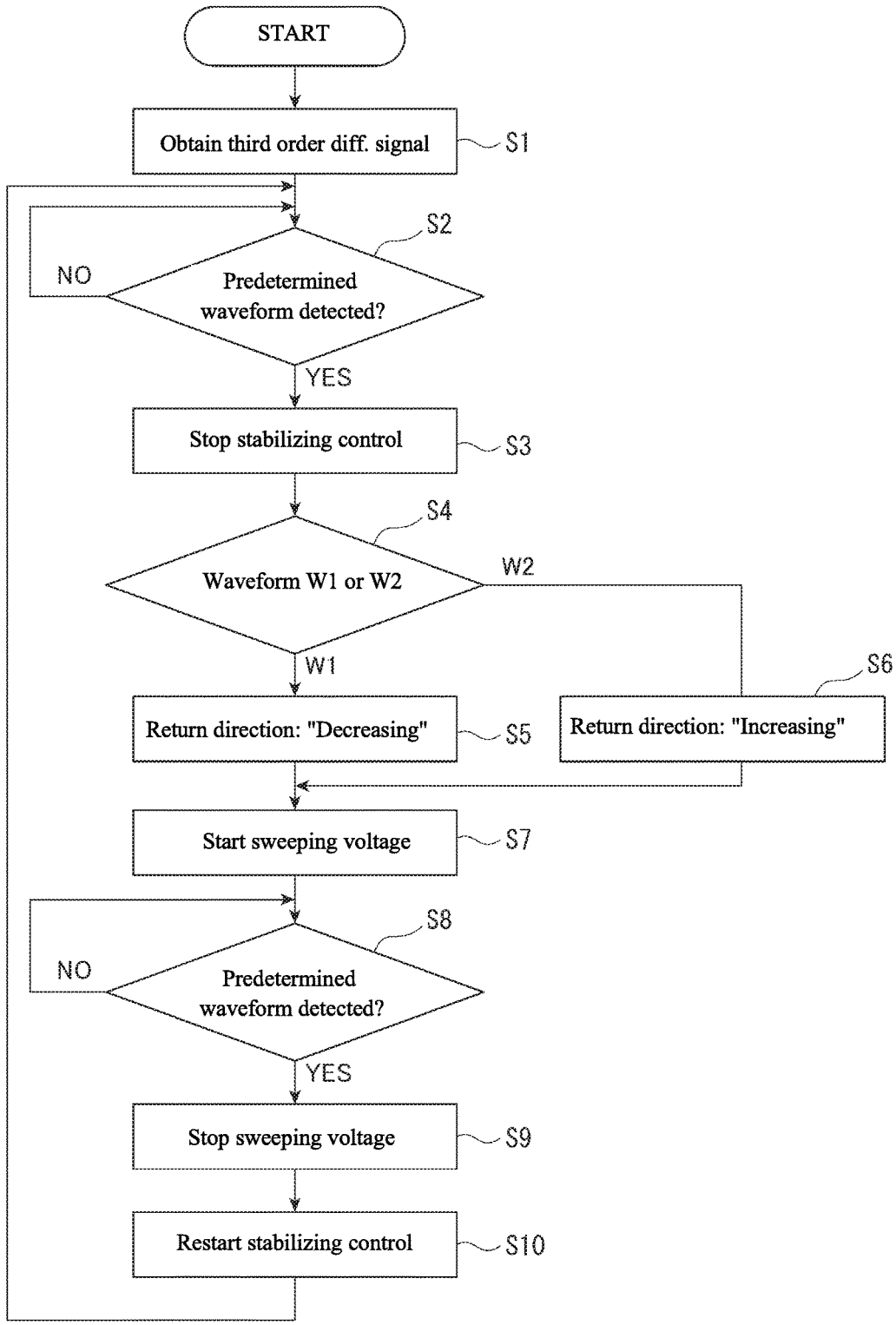
FIG. 3 is a flow chart illustrating a frequency return process in the embodiment.

Hereafter, operations of the frequency stabilizing control are described with reference to the flowchart of FIG. 3. After the frequency stabilizing control is started, the return controller 42 starts obtaining the output value of the third order differential signal Sd3 and monitors the obtained output value of the third order differential signal Sd3 (Step S1). During this time, the memory 43 stores the output value of the third order differential signal Sd3 for a predetermined time along with the time it took to obtain, and updates regularly.

Figure 5:
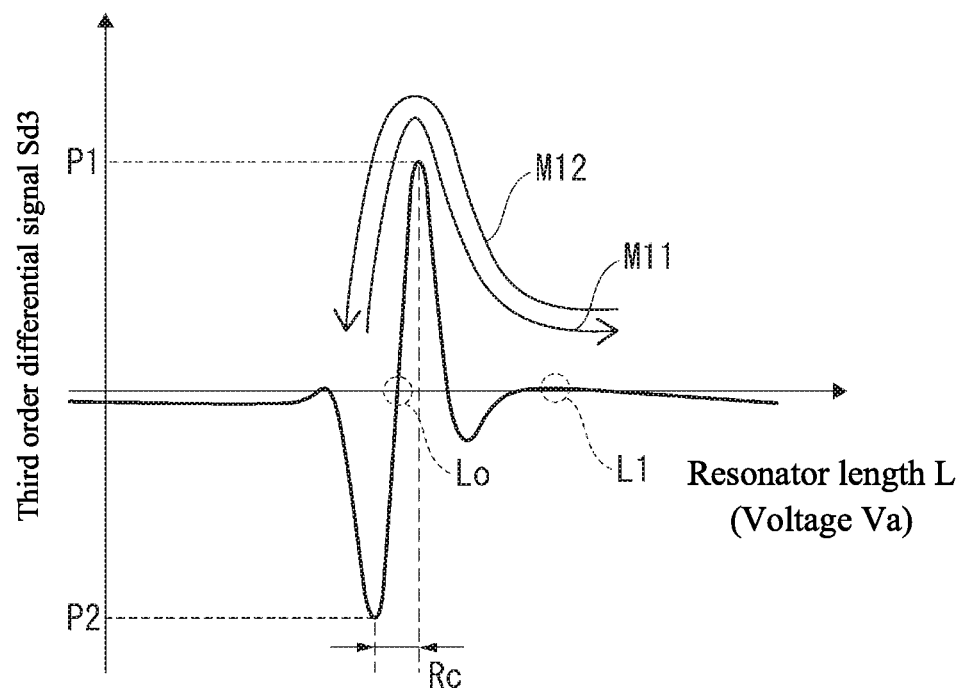
FIG. 5 is a graph illustrating the change of the third order differential signal with respect to the resonator length.
Figure 6:
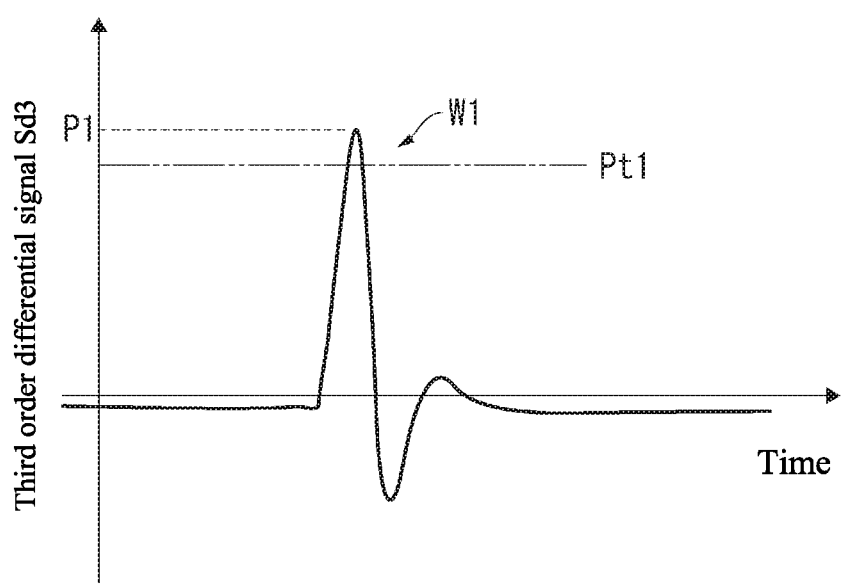
FIG. 6 is a graph illustrating a waveform of the third order differential signal at a moment when the resonator length deviates from a control range.
Figure 7:
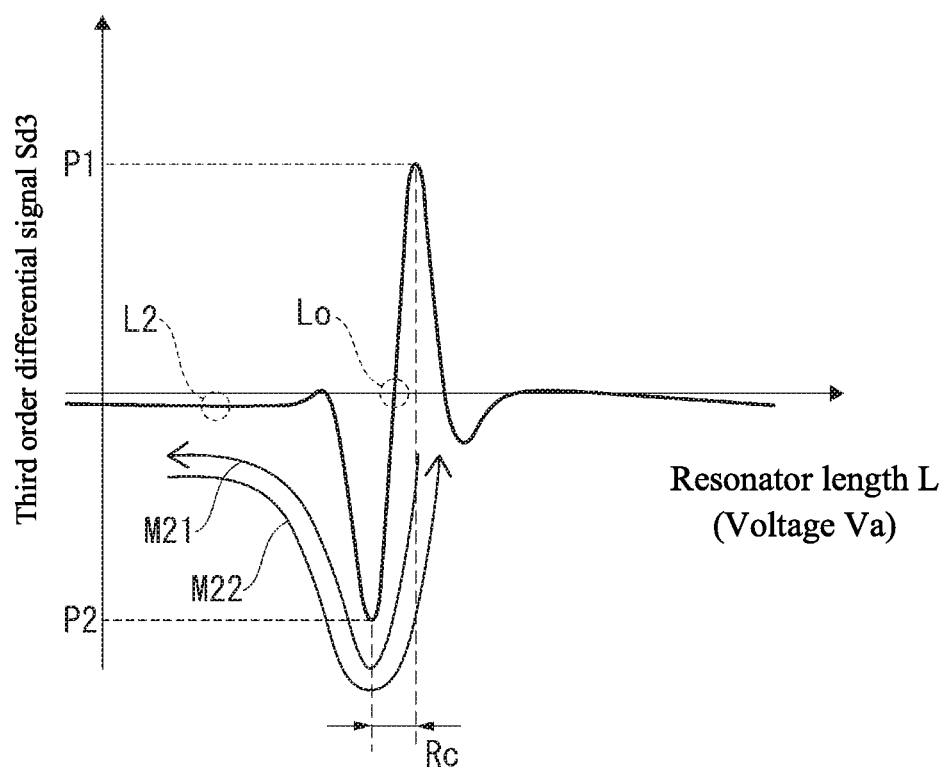
FIG. 7 is a graph illustrating the change of the third order differential signal with respect to the resonator length.
Figure 8:
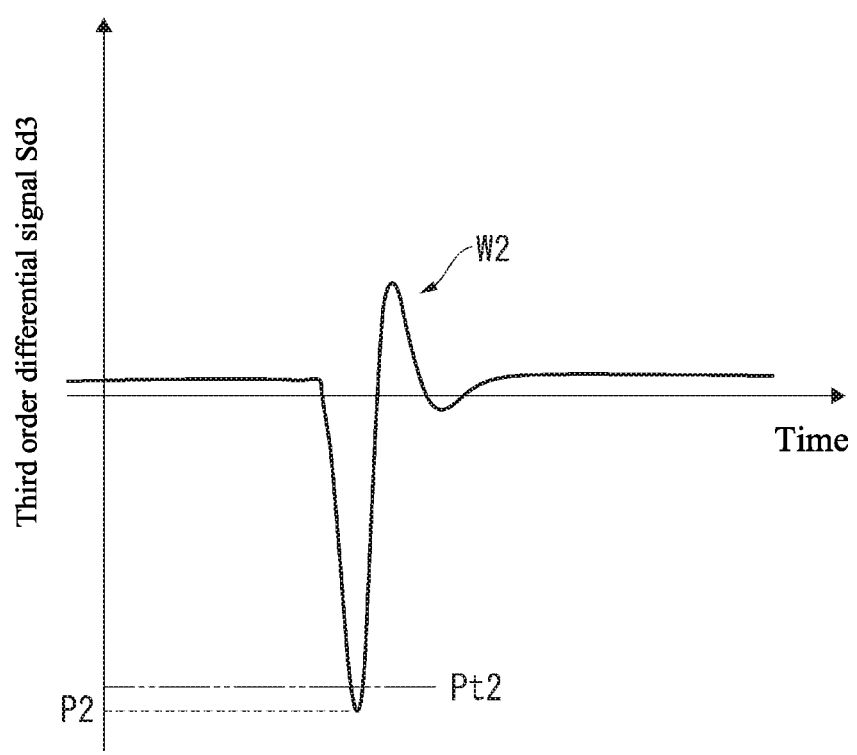
FIG. 8 is a graph illustrating the waveform of the third order differential signal at a moment when the resonator length deviates from the control range.

Next, the return controller 42 determines whether a predetermined waveform of the third order differential signal Sd3 is detected based on a transition of the third order differential signal Sd3 (Step S2). In this example, the predetermined waveform of the third order differential signal Sd3 is a waveform that appears at the moment when the resonator length L suddenly changes due to an external disturbance or the like and deviates from the control range Rc. For example, as shown in FIG. 5, when the resonator length L is greater than the control range Rc (such as when the resonator length L changes from Lo to L1), the output value of the third order differential signal Sd3 is in the vicinity of 0 V after a rapid rise and a steep dive as illustrated by an arrow M11. In other words, the third order differential signal Sd3 changes so as to exceed in a positive direction and shows a first waveform W1 as depicted in FIG. 6. Further, as shown in FIG. 7, when the resonator length L is smaller than the control range Rc (such as when the resonator length L changes from Lo to L2), the output value of the third order differential signal Sd3 is in the vicinity of 0 V after the steep dive and the rapid rise as illustrated by an arrow M21. In other words, the third order differential signal Sd3 changes so as to exceed in a negative direction and shows a second waveform W2 as depicted in FIG. 8.

In step S2, the return controller 42 determines that the first waveform W1 is detected when the third order differential signal Sd3 is near 0 V after reaching the positive peak value P1 as an initial peak value. In addition, the return controller 42 determines that the second waveform W2 is detected when the third order differential signal Sd3 is near 0 V after reaching the negative peak value P2 as the initial peak value. In this example, P1 and P2 are output values of the third order differential signal Sd3 that corresponds to an upper limit value and lower limit value of the control range Rc of the resonator length L. Here, an example of detecting the third order differential signal Sd3 returning in the vicinity of 0 V immediately after reaching the peak value P1 or P2 is described. However, instead of the peak values P1 and P2, threshold values Pt1 and Pt2 where a predetermined margin added to P1 and P2 may be defined. Specifically, the return controller 42 may determine that the first waveform W1 is detected when the third order differential signal Sd3 is returned near 0 V immediately after the third order differential signal Sd3 reaches the positive threshold value Pt1; and may determine that the second waveform W2 is detected when the third order differential signal Sd3 is returned near 0 V immediately after the third order differential signal Sd3 reaches the negative threshold value Pt2.

When the predetermined waveform of the third order differential signal Sd3 is detected (step S2: Yes), the return controller 42 causes the resonator length controller 41 to stop the frequency stabilizing control temporarily (step S3). On the other hand, when the predetermined waveform of the third order differential signal Sd3 is not detected (step S2: No), the return controller 42 repeats step S2.

Next, the return controller 42 determines the return direction of the resonator length L based on the predetermined waveform (first waveform W1 or second waveform W2) of the third order differential signal Sd3 (step S4). In step S4, when the detected waveform is the first waveform W1 (step S4: "W1", see FIG. 6), the return controller 42 determines the return direction of the resonator length L to be a decreasing direction (step S5). However, when the detected waveform is the second waveform W2 (step S4: "W2", see FIG. 8), the return controller 42 determines the return direction of the resonator length L to be an increasing direction (step S6). In other words, when the third order differential signal Sd3 is the signal exceeding in the positive direction (the initial peak value is positive), the return direction is determined to be the decreasing direction; and when the third order differential signal Sd3 is the signal exceeding in the negative direction (the initial peak value is negative), the return direction is determined to be the increasing direction. In a case where the threshold values Pt1 and Pt2 are used, when detected that the third order differential signal Sd3 has exceeded the positive threshold value Pt1, the return direction may be determined to be the decreasing direction; and when detected that the third order differential signal Sd3 has exceeded the negative threshold value Pt2, the return direction may be determined to be the increasing direction.

Then, based on the return direction determined by the return controller 42, the resonator length controller 41 starts sweeping the voltage Va and changes the resonator length L (step S7). For example, when the resonator length L is changed to L1 greater than the control range Rc due to the external disturbance or the like (see FIG. 5), the resonator length L starts decreasing by causing the resonator length controller 41 to sweep the voltage Va in the decreasing direction. Accordingly, the third order differential signal Sd3 changes as shown by an arrow M12. However, when the resonator length L is changed to L2 smaller than the control range Rc due to the external disturbance or the like (see FIG. 7), the resonator length L starts increasing by causing the resonator length controller 41 to sweep the voltage Va in the increasing direction. Accordingly, the third order differential signal Sd3 changes as shown by an arrow M22.

Next, the return controller 42 determines whether the predetermined waveform of the third order differential signal Sd3 is detected again (Step S8). The predetermined waveform detected in step S8 originates from the change where the resonator length L returns to the initial control range Rc and the specific method of detecting the predetermined waveform by the return controller 42 is the same as step S2.

When the return controller 42 detects the predetermined waveform (step S8: Yes), the resonator length L returns to the control range Rc. Therefore, the return controller 42 causes the resonator length controller 41 to stop sweeping the voltage (step S9), to restart the frequency stabilizing control (step S10), then returns to step S2. On the other hand, when the return controller 42 does not detect the predetermined waveform (step S8: No), the resonator length L does not return to the control range Rc again. Accordingly, the return controller 42 repeats step S8 until the predetermined waveform is detected. The above-noted process is performed continuously while the frequency stabilizing control is being performed.

Effect of the Embodiment

According to the present embodiment, when the resonator length L is changed to a value outside of the control range Rc due to the external disturbance or the like, the return direction of the resonator length L is determined and by changing the resonator length L to the return direction, the resonator length L is allowed to return within the controller range Rc. Therefore, the laser device 1 can continue the frequency stabilizing control without performing the restart and the like. Further, in the present embodiment, the return direction of the resonator length L can be readily determined based on the initial peak value being positive or negative when the third order differential signal Sd3 indicates the predetermined waveform.

Modification

The present invention is not limited to the above-described embodiment, and includes modifications and improvements within a scope capable of achieving the advantages of the present invention.

The present embodiment illustrates an example where the positive peak value P1 appears in the third order differential signal Sd3 when the resonator length L increased (the third order differential signal Sd3 exceeding in the positive direction) and the negative peak value P2 appears in the third order differential signal Sd3 when the resonator length L decreased (the third order differential signal Sd3 exceeding in the negative direction). However, depending on the circuit configuration from the light converter 27 to the third order differential lock-in amplifier 32, the third order differential signal Sd3 may exceed in the negative direction due to the increase of the resonator length L and the third order differential signal Sd3 may exceed in the positive direction due to the decrease of the resonator length L. In such a case, in step S3, when the detected waveform is the first waveform W1, the return controller 42 may determine the return direction of the resonator length L to be the increasing direction; and when the detected waveform is the second waveform W2, the return controller 42 may determine the return direction of the resonator length L to be the decreasing direction.

In step S2, a criteria for judging whether the predetermined waveform of the third order differential signal Sd3 is detected can be modified appropriately. For example, the return controller 42 may determine that the predetermined waveform of the third order differential signal Sd3 is detected only with the fact having the peak value (about the same degree with P1 or P2) of the third order differential signal Sd3 being detected.

In step S4, a criteria for judging the return direction of the resonator length L can be modified appropriately. For example, the waveforms W1 and W2 of the third order differential signal Sd3 include a small peak in a reverse direction after the initial big peak (see FIGS. 6 and 8). Given this, the return controller 42 may determine the return direction of the resonator length L based on the second peak value being positive or negative in the predetermined waveform of the third order differential signal Sd3.

Figure 9:
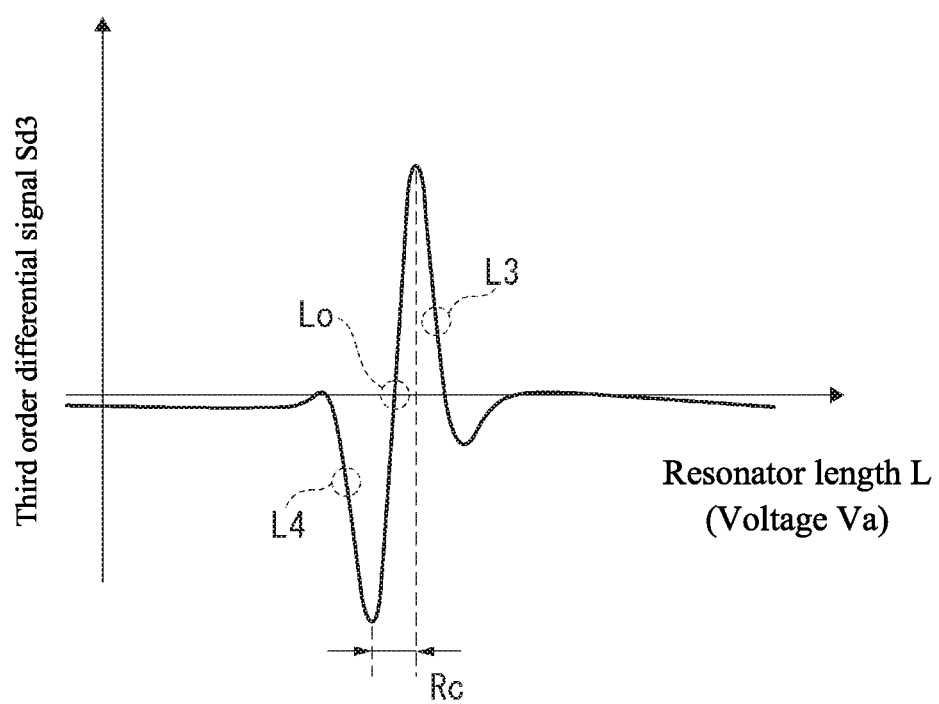
FIG. 9 is a graph illustrating the change of the third order differential signal with respect to the resonator length.
Figures 10A, 10B:
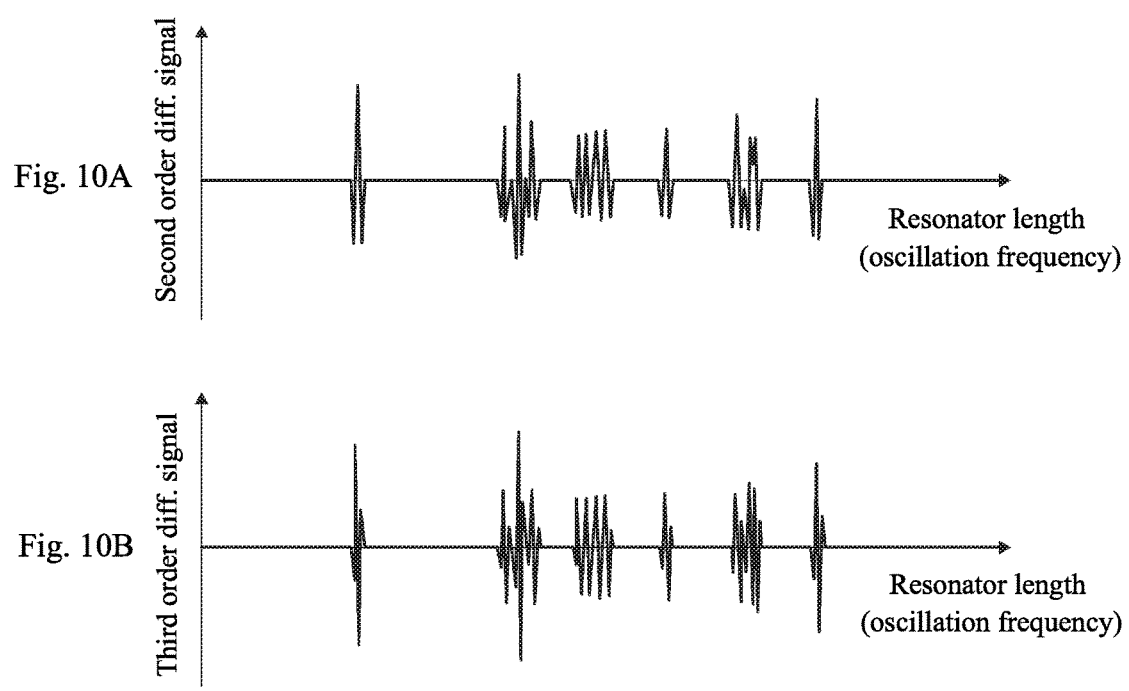
FIGS. 10A and 10B are explanatory diagrams of a conventional technique, where
Figure 12:
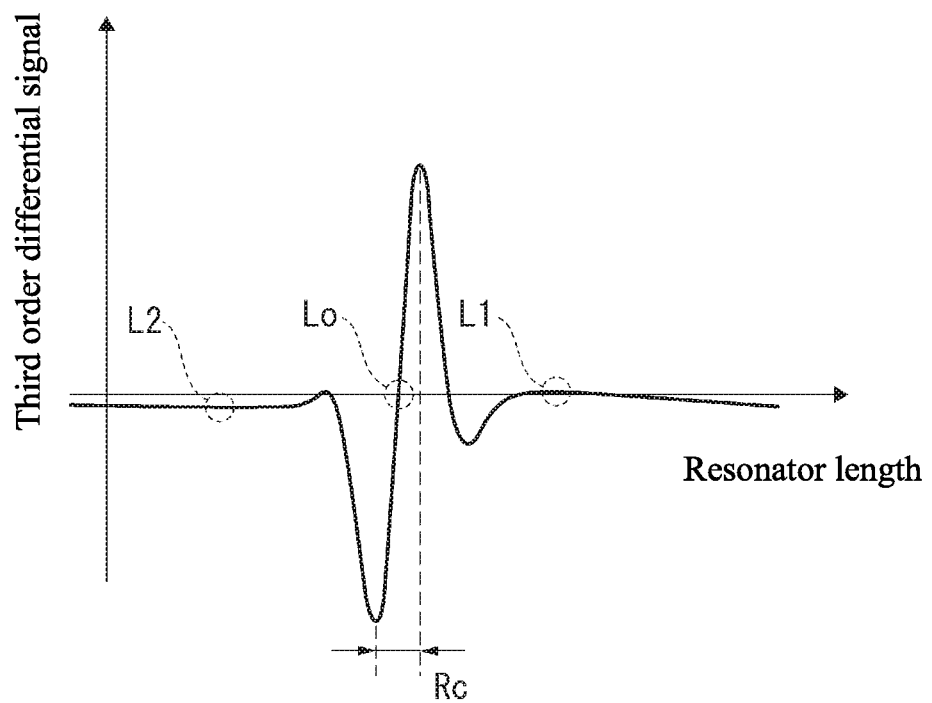
FIG. 12 is an explanatory diagram of a challenge of the present invention illustrating the change of the third order differential signal with respect to the resonator length.

In the embodiment described above, an example is given where the third order differential signal Sd3 is near 0 V by changing the resonator length L to be outside of the control range Rc (see FIGS. 5 and 7), however, the present embodiment can achieve effects even with other cases. For example, as shown in FIG. 9, in a case where the resonator length L is changed to L3 or L4 and the third order differential signal Sd3 has a value other than 0 V, the inclination depicting the change in the third order differential signal Sd3 with respect to the resonator length L is reversed compared to a case where the resonator length L is in the control range Rc. Therefore, the frequency stabilizing control cannot be performed appropriately depending on the conventional technology. On the other hand, according to the present embodiment, when the resonator length L changes to L3 or L4, similar to the case where the resonator length L changed to L1 or L2, the return controller 42 detects the predetermined waveform of the third order differential signal Sd3 and allows the resonator length L to return to the control range Rc. Therefore, the frequency stabilizing control can be continued without performing the restart and the like.

In steps S7 to S9, the resonator controller 41 changes the resonator length L until the predetermined waveform of the third order differential signal Sd3 is indicated. However, the resonator length L may be changed until the third order differential signal Sd3 is near 0 V again.

The present invention provides a laser device which can continue a stable frequency stabilizing control and a laser stabilizing method.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A laser device comprising:
   an excitation light source;
   a resonator which receives excitation light from the excitation light source and generates laser light;
   an absorption cell to which the laser light is emitted;
   a light converter which converts the laser light passing through the absorption cell to a light output signal;
   a differential signal generator which generates a third order differential signal of the light output signal; and
   a processor and a memory that stores an instruction, the processor further comprising, as a configuration when the processor executes the instruction stored in the memory:
      a return controller which determines, when a predetermined waveform of the third order differential signal is detected, a return direction of the resonator length based on the predetermined waveform; and
      a resonator length controller which changes the resonator length to the return direction.

2. The laser device according to claim 1, wherein the return controller determines the return direction of the resonator length based on an initial peak value being positive or negative when the third order differential signal indicates the predetermined waveform.

3. A laser stabilizing method employing a laser device that comprises an excitation light source; a resonator which receives excitation light from the excitation light source and generates laser light; an absorption cell to which the laser light is emitted; a light converter which converts the laser light passing through the absorption cell to a light output signal; and a differential signal generator which generates a third order differential signal of the light output signal, the method comprising:
   determining, when the predetermined form of the third order differential signal is detected, a return direction of the resonator length based on the waveform; and
   changing the resonator length to the return direction.

* * * * *